United States Patent [19]

Corbach et al.

[11] Patent Number: 4,827,173
[45] Date of Patent: May 2, 1989

[54] COMMUTATOR MOTOR, ESPECIALLY A SMALL MOTOR FOR MOTOR VEHICLES

[75] Inventors: Rainer Corbach, Lüdinghausen; Adlof Mohr, Bühlertal; Berthold Utsch, Borkum-Stiepel; Kurt Zimmermann, Bietigheim, all of Fed. Rep. of Germany

[73] Assignee: Robert Bosch GmbH, Stuttgart, Fed. Rep. of Germany

[21] Appl. No.: 33,083
[22] PCT Filed: May 13, 1986
[86] PCT No.: PCT/DE86/00201
§ 371 Date: Feb. 12, 1987
§ 102(e) Date: Feb. 12, 1987
[87] PCT Pub. No.: WO86/07505
PCT Pub. Date: Dec. 18, 1986

[30] Foreign Application Priority Data

Dec. 6, 1985 [DE] Fed. Rep. of Germany ..... 35210370

[51] Int. Cl.⁴ ............................................. H02K 1/18
[52] U.S. Cl. ..................................... 310/218; 310/91; 310/154; 310/185; 310/258
[58] Field of Search ................ 310/154, 40 MM, 258, 310/233, 89, 91, 44, 185, 186, 254, 42, 216, 218, 187, 135

[56] References Cited

U.S. PATENT DOCUMENTS

| | | | |
|---|---|---|---|
| 3,489,937 | 1/1970 | Maher | 310/258 |
| 3,594,599 | 7/1971 | West | 310/154 |
| 4,491,756 | 1/1985 | Tomite | 310/154 |
| 4,542,314 | 9/1985 | Corbach | 310/154 |

FOREIGN PATENT DOCUMENTS

| | | |
|---|---|---|
| 2735778 | 1/1979 | Fed. Rep. of Germany . |
| 2201571 | 4/1974 | France . |
| 0499661 | 11/1954 | Italy ................................... 310/154 |
| 0053073 | 3/1984 | Japan . |
| 0013457 | 1/1985 | Japan . |
| 0102858 | 6/1985 | Japan . |
| 2013414 | 8/1979 | United Kingdom . |
| 0002802 | 8/1982 | World Int. Prop. O. . |

Primary Examiner—R. Skudy
Attorney, Agent, or Firm—Walter Ottesen

[57] ABSTRACT

In a permanent-magnet-excited commutator motor, especially a small motor for motor vehicles, the short-circuit ring (13) of the stator (12) has soft iron auxiliary poles (16), to attain an inverse speed characteristic. The permanent magnets (15) rest with their arc-shaped outer face on the short-circuit ring (13) and are laterally supported on one side by a side flank of the auxiliary poles (16) and on the other side by a supporting element retained on the short-circuit ring (13). To enable securing the permanent magnets in a manner suitable for large-scale mass production, the supporting elements are embodied as protrusions (19) bulging radially in the inward direction and integral with the short-circuit ring (13). Assembly is accomplished by simple insertion of the permanent magnets (15) between the auxiliary poles (16) and the associated protrusions (19). The magnets are thus reliably held such that tangential shifting in the circumferential direction of the short-circuit ring (13) and rotation inward are prevented.

9 Claims, 3 Drawing Sheets

COMMUTATOR MOTOR, ESPECIALLY A SMALL MOTOR FOR MOTOR VEHICLES

FIELD OF THE INVENTION

This invention relates to a commutator motor, especially a small motor for motor vehicles.

BACKGROUND OF THE INVENTION

Commutator motors of this type, because of the soft iron auxiliary poles that are provided, exhibit an inverse speed characteristic, which makes them suitable for use as drive motors for starters in motor vehicles or for blowers in vacuum cleaners.

In a known commutator motor of this type (U.S. Pat. No. 3,594,599), the soft iron auxiliary poles are secured with threaded bolts to the short-circuit ring, and the permanent-magnet poles are arrested by means of pressing springs on the side remote from the auxiliary poles, these pressing springs being secured to the short-circuit ring and pressing the permanent-magnet poles against the corresponding associated auxiliary pole. This kind of arresting of the permanent-magnet poles is necessary for positioning them, so that pole shifting cannot be caused by centrifugal and cross-field forces during commutator motor operation or by jarring when the commutator motor is not in operation, such as when it is being installed in the motor vehicle. Especially in commutator motors having a high number of poles, this kind of pole shifting would mean a wider range of deviation in terms of brush twisting. Yet deviations from optimal brush twisting lead to increased brush wear (at an overly large twisting angle), or in a worsening of efficiency (at too small a twisting angle). The fastening construction of the permanent-magnet poles as described in the known commutator motor is very expensive to assemble, however, and is unsuitable for large-scale mass production.

SUMMARY OF THE INVENTION

The commutator motor of the invention includes: a stator including a short-circuit annular member defining a longitudinal axis with the annular member having an inner wall surface. A rotor has an armature winding supported thereon and is rotatably mounted in the stator for rotation in a predetermined rotational direction. An even number of shell-like permanent-magnet poles have respective cross sections of a shape corresponding approximately to a segment of a cylinder and these permanent-magnet poles have curved outer surfaces facing away from the longitudinal axis and are arranged on the annular member so as to be evenly spaced at the same angle one from the other. Each of the permanent-magnet poles has a radially-extending first side edge defining the leading edge thereof with respect to said rotational direction and a second side edge defining the trailing edge thereof with respect to the rotational direction.

The commutator motor according to the invention further includes an even number of auxiliary poles made of ferromagnetic material and corresponding in number to the permanent-magnet poles. The auxiliary poles have respective side flanks and are arranged on the annular member so as to be directly at the leading edge of corresponding ones of the permanent-magnet poles. Bracing means are formed on the inner wall surface of the annular member to coact with the auxiliary poles for bracing the permanent-magnet poles against respective ones of the side flanks of the auxiliary poles with the curved outer surfaces thereof being in contact engagement with the inner wall surface.

The bracing means are a plurality of protrusions formed integrally with said annular member so as to extend inwardly toward the rotor from the inner wall surface of the annular member. The protrusions are disposed adjacent corresponding ones of the auxiliary poles so as to cause each of the permanent-magnet poles to be braced between one of the side flanks and one of the protrusions with the leading edge thereof being in abutment with the side flank of the auxiliary pole and the trailing edge thereof being in abutment with the protrusion. The protrusions can be in the form of a plurality of ribs, nose-like projections or bosses.

The short-circuit annular member defining the stator of the commutator motor has a predetermined length in the direction of its longitudinal axis and the ribs extend over a substantial part of this length.

The commutator motor according to the invention has the advantage over the prior art that securing the permanent magnet poles does not require the mounting of special supporting elements such as compression springs. The permanent magnets need merely be inserted between the auxiliary poles and the protrusions. The permanent magnets then adhere to the short-circuit ring by their own magnetic force. During operation, the forces of reaction produced by the torque press the permanent magnets against the auxiliary poles. The forces resulting from the armature cross-field act in attenuated form on the permanent magnets in the vicinity of the auxiliary poles in the form of pulling forces oriented toward the armature, and in the vicinity of the protrusions in the form of pressure forces oriented toward the short-circuit ring. Thus a torque acts upon each permanent magnet that attempts to turn this magnet about an axis in the direction toward the rotor, the axis coinciding with the side edge in contact with the short-circuit ring of the side face of the permanent magnet oriented toward protrusion. This kind of rotation of the permanent magnets is prevented by means of the large-area support of the permanent magnets on the associated auxiliary pole. While the motor is at a standstill, the protrusions secure the permanent magnet poles against radial shifting in the circumferential direction of the short-circuit ring, that is, shifting of a kind that could for instance be caused by jarring during installation into a motor vehicle.

Each of the permanent-magnet poles has a predetermined thickness measured in the radial direction of the stator and the curved outer surface of each of the permanent-magnet poles has a prredetermined arcuate length measured in the rotational direction of the rotor. The trailing edge of the permanent-magnet pole defines a radially extending surface and each of the protrusions has an elevation above the inner wall surface in the radial direction which is substantially less than the thickness of the permanent-magnet pole. The distance between each protrusion and the side flank of the auxiliary pole which coacts therrewith is matched to the arcuate length of the permanent-magnet pole so as to cause the radial axis of the protrusion to be aligned with the radially extending surface of the permanent-magnet pole. The radially extending surface is beveled in the region of the protrusion so as to cause at least the lateral edge of the permanent-magnet pole lying against the inner wall surface to be bracedly supported in the bottom of the flank of the protrusion.

By means of this embodiment of the protrusion and permanent magnet, the insertion of the permanent magnets between the auxiliary pole and the protrusion can be performed very economically and in a time-saving manner.

According to another feature of the invention, the auxiliary poles and the short-circuit annular member conjointly define a single integral piece. As a result, additional assembly time for securing the auxiliary poles to the short-circuit ring is saved.

Pursuant to a further feature of the invention, the single integral piece is made as a unitary sintered molded part. Here the auxiliary poles are obtained with sufficient magnetic "softness" without additional provisions such as soft annealing subsequent to cold deformation.

According to still another feature of the invention, the short-circuit annular member has an annular projection which extends toward the rotor and the permanent-magnet poles have respective end faces which extend transversely to the longitudinal axis of the short-circuit annular member and abut the annular projection. The permanent magnet poles extend in the direction of this longitudinal axis so as to project beyond the auxiliary poles and each of the auxiliary poles has respective end faces disposed transversely to the axis. The permanent-magnet poles are configured so as to at least partially engage the auxiliary poles at the end faces thereof. The auxiliary poles extend in the direction of the longitudinal axis of the short-circuit annular member so as to project beyond the permanent-magnet poles and each of the permanent-magnet poles has respective end faces disposed transversely to this axis. The auxiliary poles are configured so as to at least partially engage the permanent-magnet poles at the end faces thereof.

By means of these provisions, secure positioning of the permanent magnet poles in the axial direction of the motor is attained at the same time, without requiring additional assembly work.

BRIEF DESCRIPTION OF THE DRAWINGS

The invention is described in further detail in the ensuing description, in terms of exemplary embodiments shown in the drawing. Shown are.

DESCRIPTION OF THE PREFERRED
EMBODIMENTS OF THE INVENTION

Figure 1:
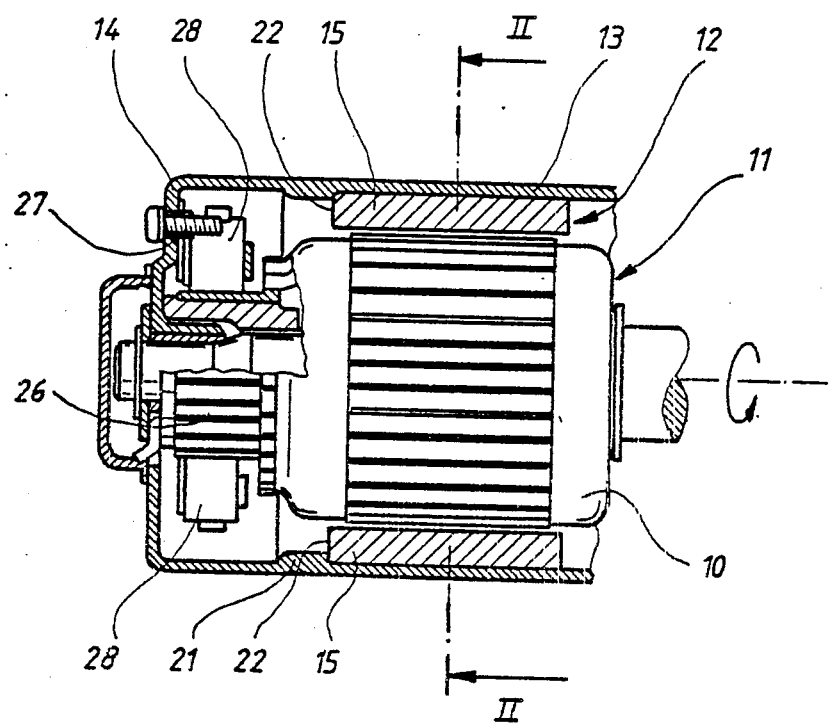
FIG. 1, a side view of a commutator motor, partially in section.

The permanent-magnet-excited small motor, shown in FIG. 1 as an example of a commutator motor, for a starter of a motor vehicle has a rotor 11 carrying an armature winding 10 and a stator 12 surrounding the rotor 11. On a short-circuit ring 13, which here is integral with the motor housing 14, the stator 12 has an even number 2p—in this case, six (see FIG. 2)—of permanent magnet poles 15 disposed offset by the same crcumferential angle 5. Each permanent magnet pole 15 is embodied as an approximately shell-shaped magnet segment with a cross section in the form of a cylinder segment, the outer arc diameter of which corresponds to the inside diameter of the short-circuit ring 13. The short-circuit ring 13 also has a number—in this case, six—of auxiliary poles 16 corresponding to the number of permanent magnet poles 15, the auxiliary poles being integral with the short-circuit ring 13. Each auxiliary pole 16 is associated with one permanent magnet pole 15, and is disposed on the radially extending side 17 of the permanent magnet pole 15 that has the leading edge 33 in terms of the direction of rotor rotation 34. The trailing edge of permanent magnet pole 15 with respect to the direction of rotation 34 of the rotor is identified by reference numeral 35. On the opposite side 18 of the permanent magnet poles 15 in the rotational direction of the rotor 11, the short-circuit ring 13 has protrusions 19 formed on its inner wall surface 30 which bulge radially toward the rotor, which serve as supporting elements for the permanent magnet poles 15 in such a manner that each permanent magnet pole 15 inserted between one protrusion 19 and one auxiliary pole 16 rests in a form-fitting manner with its side 17 on the radial side flank 20, facing toward it, of the auxiliary pole 16 and is pressed against it slightly. The protrusions 19 that are integral with the short-circuit ring 13 may be embodied as ribs, stubs or the like.

Figure 2:
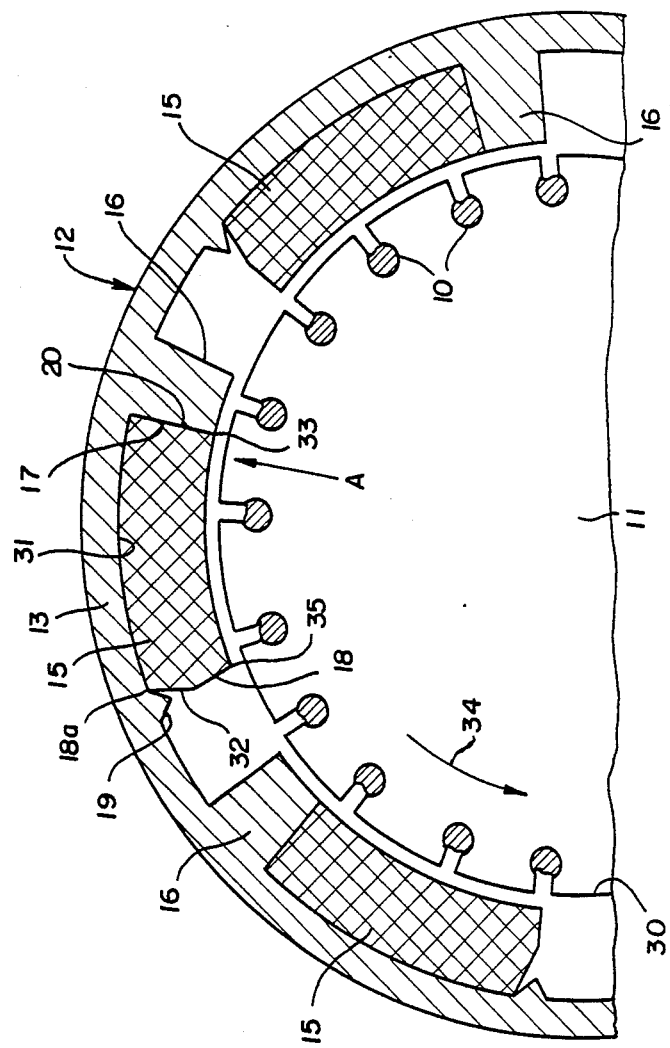
FIG. 2, a section of the commutator motor taken along the line II—II of FIG. 1, shown on a larger scale.

The protrusions 19 visible in cross section in FIG. 2 are embodied as protrusions, which widen toward the rib bottom and extend over a substantial portion of the axial length of the short-circuit ring 13. The radial protrusion height is substantially less than the radial thickness of the permanent magnet poles 15. The spacing of the protrusion 19 from the associated auxiliary poles 16 and the arc length 31 of the associated permanent magnet poles 15 are matched to one another such that the radial protrusion axis is in alignment with the radially extending side face 18 of the permanent magnet pole 15. In the vicinity of the rib 19, the side face 18 of each permanent magnet pole 15 is beveled 32 in such a manner that at the protrusion bottom, the side edge 18a of the side face 18 resting on the short-circuit ring 13 is supported on the protrusion flank. By means of this embodiment of the protrusion 19 and the permanent magnet pole 15, the permanent magnet pole can be pivoted into place very effortlessly between the auxiliary pole 16 and the protrusion 19, after which it adheres automatically to the short-circuit ring 13 by its magnetic force. The auxiliary pole 16 and protrusion 19 prevent on the one hand displacement of the inserted permanent magnet pole 15 in the circumferential direction of the short-circuit ring 13, and on the other hand prevents a pivotal displacement of the permanent magnet pole 15, caused by the forces of the armature crossfield, about its side edge 18a in the direction toward the rotor 11.

Axial shifting of the permanent magnet poles 15 is prevented by means of an annular protrusion 21 (see FIG. 1) disposed on and integral with the short-circuit ring 13, the permanent magnet poles 15 resting on this protrusion with one of their face sides 22 extending crosswise to the axial direction.

Figure 3:
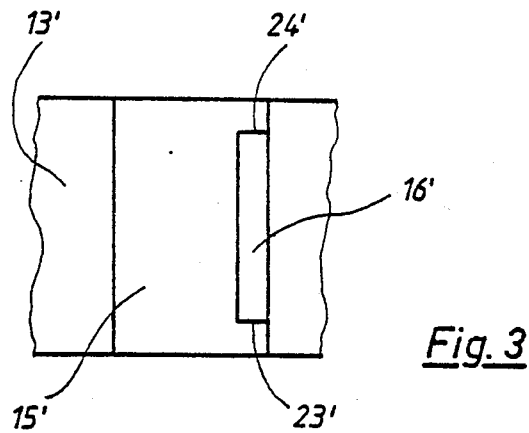
FIGS. 3 and 4, each, one plan view on the auxiliary pole and permanent magnet pole in the direction of the arrow A of FIG. 2, according to two further exemplary embodiments.
Figure 4:
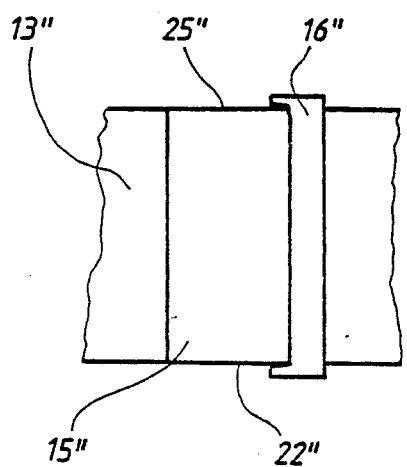

To secure the permanent magnet poles 15 against axial shifting, it is possible to provide, in accordance with a further exemplary embodiment shown in FIG. 3, that the permanent magnet poles 15' overlap the auxiliary poles 16' on their two face sides 23', 24' extending crosswise to the axial direction, or vice versa, as shown in the exemplary embodiment of FIG. 4, the auxiliary poles 16" overlap the permanent magnet poles 15" in a form-fitting manner in the axial direction on their two end sides 22", 25" extending crosswise to the axial direction. The short-circuit ring is shown fragmentarily in FIG. 3 and 4 and is indicated as 13' and 13", respectively.

The commutator rotating rigidly with the rotor 11 in a known manner is represented at 26 in FIG. 1. The commutator 26, here embodied as a drum collector, is electrically connected with the armature winding 10. A brush holder 27 secured to the housing 14 has a brush attachment of six commutator brushes 28 disposed offset by equal circumferential angles, which slide on the commutator 26. The short-circuit ring 13 and the auxiliary poles 16 are suitably manufactured with precise shapes from a one-piece sintered molded part from a highly pure, highly densifiable iron powder, such as Sint Do2.

We claim:

1. A commutator motor such as a motor for motor vehicles, the commutator motor comprising:
   a stator including a short-circuit annular member defining a longitudinal axis, said annular member having an inner wall surface;
   a rotor having an armature winding supported thereon and being rotatably mounted in said stator for rotation in a predetermined rotational direction;
   an even number of shell-like permanent-magnet poles having respective cross sections of a shape corresponding approximately to a segment of a cylinder, said permanent-magnet poles having curved outer surfaces facing away from said longitudinal axis and being arranged on said annular member so as to be evenly spaced at the same angle one from the other, each of said permanent-magnet poles having a leading edge and a trailing edge with respect to said rotational direction, each of said permanent-magnet poles also having a radially-extending first side face terminating in a first side edge defining said leading edge thereof and a second side face terminating in a second side edge defining said trailing edge thereof;
   an even number of auxiliary poles made of ferromagnetic material and corresponding in number to said permanent-magnet poles, said auxiliary poles having respective side flanks and being arranged on said annular member so as to be directly at the leading edge of corresponding ones of said permanent-magnet poles;
   said annular member having a plurality of protrusions formed on said inner wall surface of said annular member for coacting with said auxiliary poles for bracing said permanent-magnet poles against respective ones of said side flanks with said curved outer surfaces thereof being in contact engagement with said inner wall surface;
   said plurality of protrusions being formed integrally with said annular member so as to extend inwardly toward the rotor from said inner wall surface, said protrusions being disposed adjacent corresponding ones of said auxiliary poles so as to cause each of said permanent-magnet poles to be braced between one of said side flanks and one of said protrusions with said first side face thereof being in abutment with the side flank and the second side face thereof being in abutment with the protrusion;
   said short-circuit annular member having a predetermined length in the direction of said axis; and, said plurality of protrusions extending over a substantial part of said length;
   each of said permanent-magnet poles having a predetermined thickness measured in the radial direction of said stator, and the curved outer surface of each of said permanent-magnet poles having a predetermined arcuate length measured in said rotational direction; the trailing edge of the permanent-magnet pole defining a radially extending surface;
   each of said protrusions having an elevation above said inner wall surface in said radial direction which is substantially less than said thickness of said each permanent-magnet pole;
   the distance between each protrusion and the side flank of the auxiliary pole coacting therewith being matched to said arcuate length so as to cause the radial axis of the protrusion to be aligned with said radially extending surface of said each permanent-magnet pole; and,
   said radially extending surface being beveled in the region of the protrusion so as to cause at least the lateral edge of said each permanent-magnet pole lying against said inner wall surface to be bracedly supported in the bottom of the flank of the protrusion.

2. The commutator motor of claim 1, said protrusions being in the form of a plurality of ribs.

3. The commutator motor of claim 1, said auxiliary poles and said short-circuit annular member conjointly defining a single integral piece.

4. The commutator motor of claim 3, said single integral piece being made as a unitary sintered molded part.

5. The commutator motor of claim 1, said short-circuit annular member having an annular projection extending toward the rotor; and, said permanent-magnet poles havig respective end faces extending transversely to said longituidnal axis and abutting said annular projection.

6. The commutator motor of claim 1, said permanent magnet poles extending in the direction of said axis so as to project beyond said auxiliary poles; each of said auxiliary poles having respective end faces disposed transversely to said axis; and, said permanent-magnet poles being configured so as to at least partially engage said auxiliary poles at said end faces thereof.

7. The commutator motor of claim 1, said auxiliary poles extending in the direction of said axis so as to project beyond said permanent-magnet poles; each of said permanent-magnet poles having respective end faces disposed transversely to said axis; and, said auxiliary poles being configured so as to at least partially engage said permanent-magnet poles at said end faces thereof.

8. A commutator motor such as a motor for motor vehicles, the commutator motor comprising:
   a stator including a short-circuit annular member defining a longitudinal axis, said annular member having an inner wall surface;
   a rotor having an armature winding supported thereon and being rotatably mounted in said stator for rotation in a predetermined rotational direction;
   an even number of shell-like permanent-magnet poles having respective cross sections of a shape corresponding approximately to a segment of a cylinder, said permanent-magnet poles having curved outer surfaces facing away from said longitudinal axis and being arranged on said annular member so as to be evenly spaced at the same angle one from the other, each of said permanent-magnet poles having a leading edge and a trailing edge with respect to said rotational direction, each of said permanent-magnet poles also having a radially-extending first side face terminating in a first side edge defining said leading edge thereof and a second side face terminating in a second side edge defining said trailing edge thereof;

an even number of auxiliary poles made of ferromagnetic material and corresponding in number to said permanent-magnet poles, said auxiliary poles having respective radially extending side flanks and being arranged on said annular member so so as to be directly at the leading edge of corresponding ones of said permanent-magnet poles;

each one of said auxiliary poles and a corresponding one of said permanent-magnet poles being juxtaposed so as to cause said first side fce of said corresponding one of said permanent-magnet poles to be in full flush contact engagement with said side flank of said one of said auxiliary poles;

said annular member having a plurality of protrusions formed on said inner wall surface of said annular member for coacting with said auxiliary poles for bracing said permanent-magnet poles against respective ones of said side flanks with said curved outer surfaces thereof being in contact engagement with said inner wall surface;

said plurality of protrusions being formed integrally with said annular member so as to extend inwardly toward the rotor from said inner wall surface, said protrusions being disposed adjacent corresponding ones of said auxiliary poles so as to cause each of said permanent-magnet poles to be braced between one of said side flanks and one of said protrusions with said first side face thereof being in abutment with the side flank and said second side face of the permanent-magnet pole being in abutment with the protrusion;

said short-circuit annular member having a predetermined length in the direction of said axis; and, said plurality of protrusions extending over a substantial part of said length; and, said auxiliary poles and said short-circuit annular member conjointly defining a single integral piece made as a unitary sintered molded part.

9. A commutator motor such as a motor for motor vehicles, the commutator motor comprising:

a stator including a short-circuit annular member defining a longitudinal axis, said annular member having an inner wall surface;

a rotor having an armature winding supported thereon and being rotatably mounted in said stator for rotation in a predetermined rotational direction;

an even number of shell-like permanent-magnet poles having respective cross sections of a shape corresponding approximately to a segment of a cylinder, said permanent-magnet poles having curved outer surfaces facing away from said longitudinal axis and being arrange on said annular member so as to be evenly spaced at the same angle one from the other, each of said permanent-magnet poles having a leading edge and a trailing edge with respect to said rotational direction, each of said permanent-magnet poles also having a radially-extending first side face terminating in a first side edge defining said leading edge thereof and a second side face terminating in a side edge defining said trailing edge thereof;

an even number of auxiliary poles made of ferromagnetic material and corresponding in number to said permanent-magnet poles, said auxiliary poles having respective side flanks and being arranged on said annular member so as to be directly at the leading edge of corresponding ones of said permanent-magnet poles;

said annular member having a plurality of protrusions formed on said inner wall surface of said annular member for coacting with said auxiliary poles for bracing said permanent-magnet poles against respective ones of said side flanks with said curved outer surfaces thereof being in contact engagement with said inner wall surface;

said plurality of protrusions on said annular member so as to extend inwardly toward the rotor from said inner wall surface, said protrusions being disposed adjacent corresponding ones of said auxiliary poles so as to cause each of said permanent-magnet poles to be braced between one of said flanks and one of said protrusions with said first side face thereof being in abutment with the side flank and said second side face thereof being in abutment with the protrusion;

said short-circuit annular member having a predetermined length in the direction of said axis; and, said plurality of protrusions being a plurality of ribs extending over a substantial part of said length;

each of said permanent-magnet poles having a predetermined thickness measured in the radial direction of said stator, and the curved outer surface of each of said permanent-magnet poles having a predetermined arcuate length measured in said rotational direction; said second side face of the permanent-magnet pole defining an end surface extending toward said rotor; each of said ribs having an elevation above said inner wall surface in said radial direction which is substantially less than said thickness of the permanent-magnet pole; the distance between the base of each of said ribs and the side flank of the auxiliary pole coacting therewith being matched to said arcuate length;

said end surface of each of said permanent-magnet poles being beveled to provide a beveled surface in the region of each of said ribs so as to cause at least the lateral edge of said permanent-magnet pole lying against said inner wall surface to be bracedly supported in the bottom of the flank of the corresponding one of said ribs; and, said flank of each of said ribs and said beveled surface conjointly defining an acute angle opening toward the rotor so as to permit the permanent-magnet pole to be pivoted into place between the auxiliary pole and the corresponding one of said ribs.

* * * * *

UNITED STATES PATENT AND TRADEMARK OFFICE
CERTIFICATE OF CORRECTION

PATENT NO. : 4,827,173

DATED : May 2, 1989

INVENTOR(S) : Rainer Corbach, Adolf Mohr, Berthold Utsch and Kurt Zimmermann

It is certified that error appears in the above-identified patent and that said Letters Patent is hereby corrected as shown below:

On the title page, item [75], under "Inventors:" delete "Adlof Mohr" and substitute -- Adolf Mohr -- therefor.

On the title page, item [30], under "Foreign Application Priority Data" delete "Dec. 6, 1985 [DE] . . ." and substitute -- Jun. 12, 1985 [DE] . . . -- therefor.

In the Abstract, line 19: insert -- (FIG. 2) -- before the period.

In column 1, line 6: delete "This" and substitute -- The -- therefor.

UNITED STATES PATENT AND TRADEMARK OFFICE
CERTIFICATE OF CORRECTION

PATENT NO. : 4,827,173

DATED : May 2, 1989

INVENTOR(S) : Rainer Corbach, Adolf Mohr, Berthold Utsch and Kurt Zimmermann

It is certified that error appears in the above-identified patent and that said Letters Patent is hereby corrected as shown below:

In column 2, line 41: insert -- the -- between "toward" and "protrusion.".

In column 2, line 61: delete "therrewith" and substitute -- therewith -- therefor.

In column 3, line 67: delete "crcumferential" and substitut -- circumferential -- therefor.

In column 4, line 28: delete "protrusions," and substitute -- ribs, -- therefor.

In column 4, line 29: delete "rib" and substitute -- protrusion -- therefor.

UNITED STATES PATENT AND TRADEMARK OFFICE
CERTIFICATE OF CORRECTION

PATENT NO. : 4,827,173

DATED : May 2, 1989

INVENTOR(S) : Rainer Corbach, Adolf Mohr, Berthold Utsch and Kurt Zimmermann

It is certified that error appears in the above-identified patent and that said Letters Patent is hereby corrected as shown below:

In column 4, line 39: insert -- at -- between "beveled" and "32".

In column 6, line 36: delete "havig" and substitute -- having -- therefor.

In column 6, line 37: delete "longituidnal" and substitute -- longitudinal -- therefor.

In column 7, line 13: delete "so", first occurrence.

In column 7, line 18: delete "fce" and substitute -- face -- therefor.

In column 7, line 60: delete "arrange" and substitute -- arranged -- therefor.

Signed and Sealed this

Twenty-ninth Day of May, 1990

*Attest:*

HARRY F. MANBECK, JR.

*Attesting Officer*  *Commissioner of Patents and Trademarks*